(12) United States Patent
Reed et al.

(10) Patent No.: US 7,109,870 B1
(45) Date of Patent: Sep. 19, 2006

(54) FISHING ACCESSORY

(76) Inventors: Robert R. Reed, P.O. Box 1485, Pinetop, AZ (US) 85935; Sheldon A. Reed, II, P.O. Box 1485, Pinetop, AZ (US) 85935

( * ) Notice: Subject to any disclaimer, the term of this patent is extended or adjusted under 35 U.S.C. 154(b) by 0 days.

(21) Appl. No.: 10/176,730

(22) Filed: Jun. 21, 2002

Related U.S. Application Data

(60) Provisional application No. 60/301,648, filed on Jun. 27, 2001.

(51) Int. Cl.
*G08B 23/00* (2006.01)

(52) U.S. Cl. .............. 340/573.2; 340/573.1; 340/668; 340/691.5; 43/17

(58) Field of Classification Search ........... 340/573.1, 340/573.2, 668, 691.5, 693.5, 693.9, 665; 43/17, 17.5
See application file for complete search history.

(56) References Cited

U.S. PATENT DOCUMENTS

| | | | | |
|---|---|---|---|---|
| 4,398,185 A | * | 8/1983 | Roberts | 340/573 |
| 5,063,373 A | * | 11/1991 | Lindsley | 340/573 |
| 5,321,391 A | * | 6/1994 | Fox | 340/573 |
| 5,898,372 A | * | 4/1999 | Johnson et al. | 340/573.2 |
| 5,986,552 A | * | 11/1999 | Lyons | 340/573.2 |

* cited by examiner

*Primary Examiner*—Anh V. La
(74) *Attorney, Agent, or Firm*—Roy, Kiesel et al.

(57) ABSTRACT

A fishing accessory that includes a housing and an alerting mechanism for alerting a fisherman when a fishing line connected to the activation switch of the alerting mechanism is being tugged on by a fish. The housing includes a housing having a pair of attachment clamps securable to a fishing rod. The alerting mechanism includes multiple types of alarm outputs that may be selected in various combinations by a user.

1 Claim, 2 Drawing Sheets

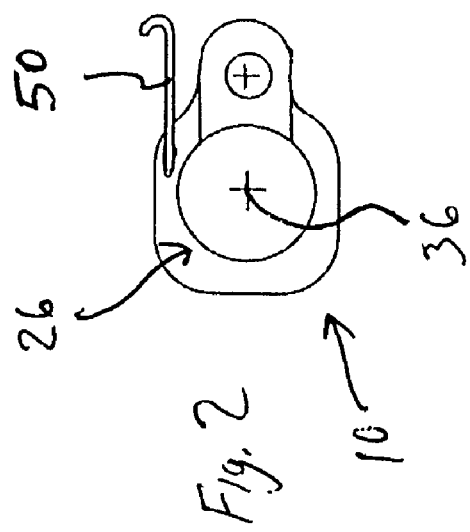
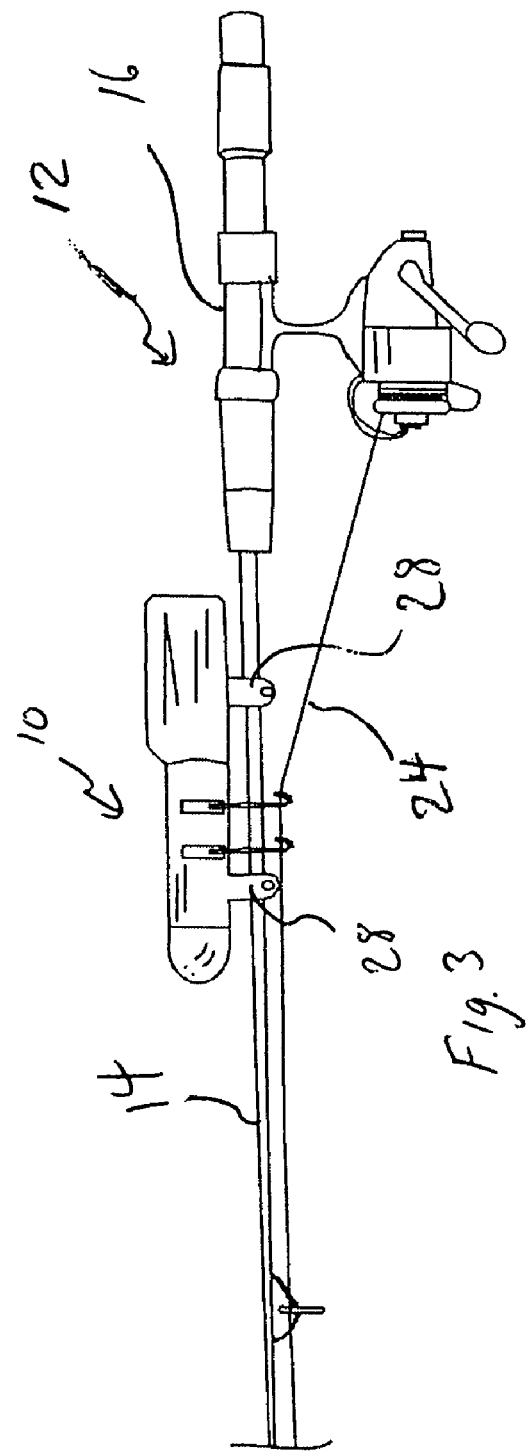

FISHING ACCESSORY

This application claims the benefit of U.S. Provisional Application No. 60/301,648, filed Jun. 27, 2001.

TECHNICAL FIELD

The present invention relates to fishing accessories and more particularly to a fishing accessory that snaps onto a fishing rod and that includes an alerting mechanism for alerting a fisherman when a fishing line connected to the fishing accessory is being tugged on by a fish; the fishing accessory including a housing having a pair of attachment clamps securable to a fishing rod and an alerting mechanism that includes: a number of batteries, a battery compartment with a battery holder for storing the number of batteries in the battery holder, a front light bulb, a buzzer mechanism, an audio/voice playback mechanism, a five-position operation select switch, and an activation switch having two separate activation hooks attached to the activation switch that each extend from the housing; the battery holder, the front light bulb, the buzzer mechanism, the audio/voice playback mechanism, the five-position operation select switch, and the activation switch being electrically connected such that a user may position the five-position operation select switch into a first position to turn the alerting mechanism off, into a second position to turn the alerting mechanism on and have the front light bulb become illuminated upon activation of the activation switch, into a third position to turn the alerting mechanism on and have the buzzer mechanism operate upon activation of the activation switch, into a fifth position to turn the alerting mechanism on and have the audio/voice playback mechanism operate upon activation of the activation switch, and into a fourth position to turn the alerting mechanism on and have the front light bulb and the buzzer mechanism operate upon activation of the activation switch.

BACKGROUND ART

Many individuals enjoy fishing but do not have the patience to constantly monitor the fishing line such that a fish may pull on the fishing line and steal the bait when the fisherman is not paying attention. It would be desirable, therefore, for these type of fishermen to have a fishing accessory which could be clipped to a fishing rod and which would give an audible and/or a visual alerting output to the fisherman such that the fisherman could rapidly retrieve the rod and attempt to set the fishhook. Because children have short attention spans, it would be a further benefit to have such a device that included an audio playback device that could be selected by a user to provide a spoken output when the device was activated. These functions also are beneficial to visual and hearing impaired sportsmen.

GENERAL SUMMARY DISCUSSION OF INVENTION

It is thus an object of the invention to provide a fishing accessory that includes an alerting mechanism for alerting a fisherman when a fishing line connected to the fishing accessory is being tugged on by a fish; a housing having a pair of attachment clamps securable to a fishing rod and an alerting mechanism that includes: a number of batteries, a battery compartment with a battery holder for storing the number of batteries in the battery holder, a front light bulb, a buzzer mechanism, an audio/voice playback mechanism, a five-position operation select switch, and an activation switch having two separate activation hooks attached to the activation switch that each extend from the housing; the battery holder, the front light bulb, the buzzer mechanism, the audio/voice playback mechanism, the five-position operation select switch, and the activation switch being electrically connected such that a user may position the five-position operation select switch into a first position to turn the alerting mechanism off, into a second position to turn the alerting mechanism on and have the front light bulb become illuminated upon activation of the activation switch, into a third position to turn the alerting mechanism on and have the buzzer mechanism operate upon activation of the activation switch, into a fifth position to turn the alerting mechanism on and have the audio/voice playback mechanism operate upon activation of the activation switch, and into a fourth position to turn the alerting mechanism on and have the front light bulb and the buzzer mechanism operate upon activation of the activation switch.

Accordingly, a fishing accessory is provided. The fishing accessory includes a housing having a pair of attachment clamps securable to a fishing rod and an alerting mechanism that includes: a number of batteries, a battery compartment with a battery holder for storing the number of batteries in the battery holder, a front light bulb, a buzzer mechanism, an audio/voice playback mechanism, a five-position operation select switch, and an activation switch having two separate activation hooks attached to the activation switch that each extend from the housing; the battery holder, the front light bulb, the buzzer mechanism, the audio/voice playback mechanism, the five-position operation select switch, and the activation switch being electrically connected such that a user may position the five-position operation select switch into a first position to turn the alerting mechanism off, into a second position to turn the alerting mechanism on and have the front light bulb become illuminated upon activation of the activation switch, into a third position to turn the alerting mechanism on and have the buzzer mechanism operate upon activation of the activation switch, into a fifth position to turn the alerting mechanism on and have the audio/voice playback mechanism operate upon activation of the activation switch, and into a fourth position to turn the alerting mechanism on and have the front light bulb and the buzzer mechanism operate upon activation of the activation switch.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 2 is a forward plan view of an exemplary embodiment of the fishing accessory.

FIG. 3 shows the exemplary fishing accessory attached to a representative fishing rod.

EXEMPLARY MODE FOR CARRYING OUT THE INVENTION

Figure 1:
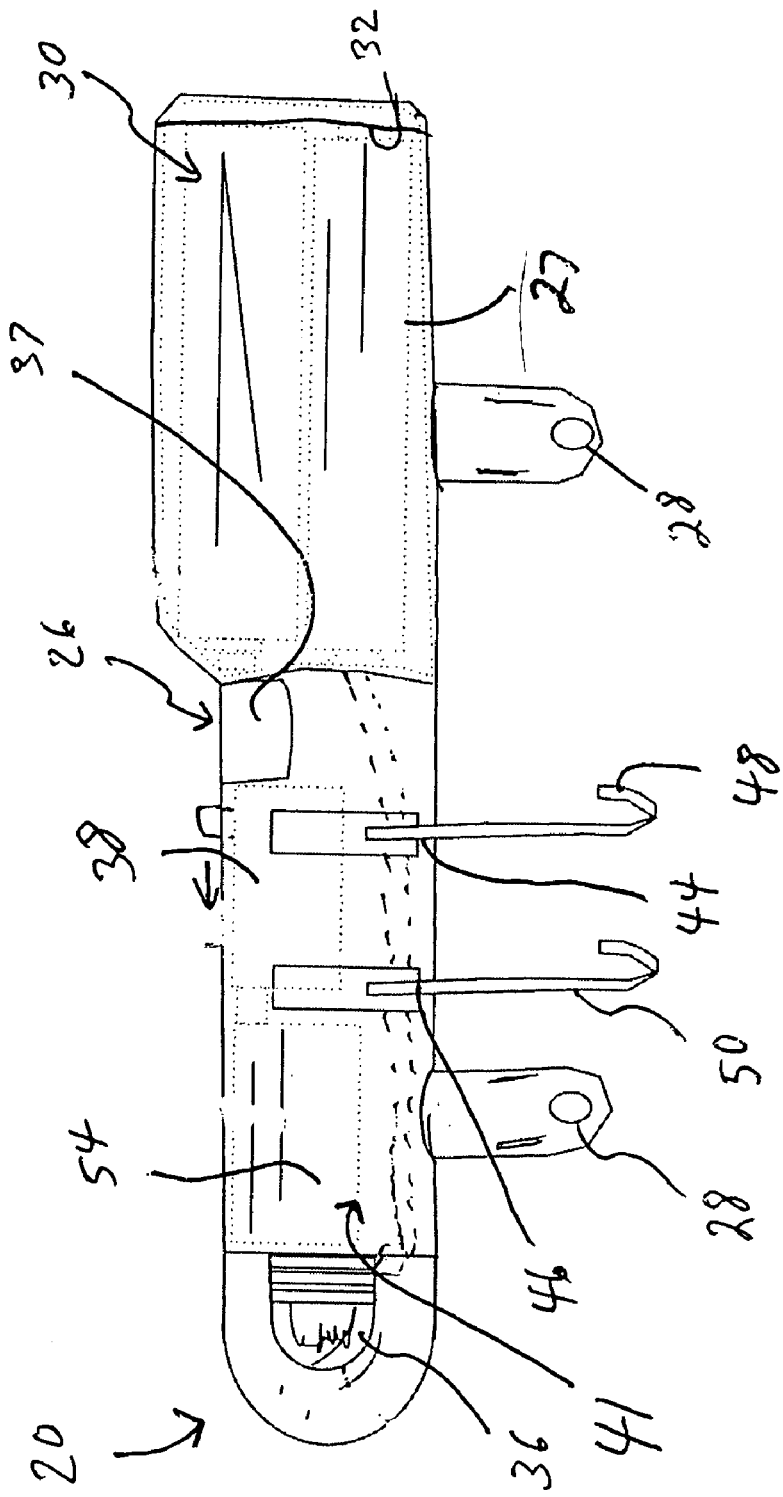
FIG. 1 is a side cutaway view of an exemplary embodiment of the fishing accessory of the present invention.

FIGS. 1–3 show various aspects of an exemplary embodiment of the fishing accessory of the present invention generally designated 10. Fishing accessory 10 is adapted for use with a fishing rod assembly generally designated 12 having a fishing rod portion 14 extending from a handle 16.

Fishing accessory 10 includes an alerting mechanism, generally designated 20, for alerting a fisherman when a fishing line 24 is being tugged by a fish. Fishing accessory 10 includes a housing generally designated 26 having a pair of attachment clamps 28 that are securable to rod portion 14 in a manner to allow the fishing rod assembly 12 to operate unimpaired. Fishing accessory 10 also includes an alerting mechanism 20 including batteries 27, a battery holder 32, a battery compartment 30 within housing 26 for receiving the batteries 27 installed in battery holder 32. Alerting mechanism 20 also includes a light bulb 36, a buzzer mechanism 38, an audio/voice playback mechanism 37, a five-position operation select switch 54, and an activation switch 41 having two activation hooks 44,46 that extend outwardly from housing 26, have a fishing line connection hook 48, 50, and are pivotally mounted to one side of housing 26 and activation switch 41 such that pulling on either activation hook 44,46 activates the alerting mechanism 20.

Battery holder 32, front light bulb 36, buzzer mechanism 38, audio/voice playback mechanism 37, five-position operation select switch 54, and the activation switch 41 being electrically connected such that a user may position the five-position operation select switch into a first position to turn the alerting mechanism 20 off, into a second position to turn the alerting mechanism 20 on and have the front light bulb 36 become illuminated upon activation of the activation switch 41, into a third position to turn the alerting mechanism 20 on and have the buzzer mechanism 38 operate upon activation of the activation switch 41, into a fifth position to turn the alerting mechanism 20 on and have the audio/voice playback mechanism 54 operate upon activation of the activation switch, and into a fourth position to turn the alerting mechanism 20 on and have the front light bulb 36 and the buzzer mechanism 38 operate upon activation of the activation switch 41.

It can be seen from the preceding description that a fishing accessory has been provided.

It is noted that the embodiment of the fishing accessory described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A fishing accessory comprising:

an alerting mechanism for alerting a fisherman when a fishing line connected to the fishing accessory is being tugged on by a fish;

the fishing accessory including a housing having a fishing rod attachment mechanism securable to a fishing rod and an electrically powered alerting mechanism that includes: a front illumination source, an audible noise generating mechanism, an operating mode select switch, and an alerting mechanism activation switch having a hook attached thereto that extends from the housing and which activates the alerting mechanism when moved from a preset position;

the operating mode select switch providing an input device to allow a user to select a desired operating mode from a list including an alerting mechanism off mode;

a front illumination source activation mode wherein only the front illumination source is activated when the alerting mechanism activation switch is moved from the preset position;

an audible noise generating activation mode wherein the audible noise generating mechanism is only activated when the alerting mechanism activation switch is moved from the preset position; a dual alerting mode wherein the audible noise generating mechanism and the front illumination source are activated when the alerting mechanism activation switch is moved from the preset position.

* * * * *